United States Patent
Guerra (10) Patent No.: US 11,739,432 B2
(45) Date of Patent: Aug. 29, 2023

(54) RADIATION-ASSISTED ELECTROLYZER CELL AND PANEL

(71) Applicant: NANOPTEK CORPORATION, Concord, MA (US)

(72) Inventor: John M. Guerra, Concord, MA (US)

(73) Assignee: Nanoptek Corporation, Concord, MA (US)

( * ) Notice: Subject to any disclaimer, the term of this patent is extended or adjusted under 35 U.S.C. 154(b) by 481 days.

(21) Appl. No.: 16/985,337

(22) Filed: Aug. 5, 2020

(65) Prior Publication Data

US 2021/0040625 A1 Feb. 11, 2021

Related U.S. Application Data

(60) Provisional application No. 62/922,418, filed on Aug. 8, 2019.

(51) Int. Cl.
*C25B 1/55* (2021.01)
*C25B 11/091* (2021.01)
(Continued)

(52) U.S. Cl.
CPC ............ *C25B 1/55* (2021.01); *B01D 19/0031* (2013.01); *C25B 1/04* (2013.01); *C25B 9/50* (2021.01);
(Continued)

(58) Field of Classification Search
CPC .... C25B 1/55; C25B 1/04; C25B 9/50; C25B 9/70; C25B 11/00; C25B 11/031;
(Continued)

(56) References Cited

U.S. PATENT DOCUMENTS 4,534,099 A * 8/1985 Howe ...................... H01G 9/20
438/585
5,348,822 A 9/1994 Ovshinsky
(Continued)

FOREIGN PATENT DOCUMENTS

CN 101189732 B * 12/2010 .............. F24S 25/10
JP 2013-049888 A 3/2013
(Continued)

OTHER PUBLICATIONS

International Search Report-Written Opinion of corresponding International Application PCT/US2020/044927, issued by European Patent Office dated Nov. 10, 2020.
(Continued)

*Primary Examiner* — Jacob M Amick
*Assistant Examiner* — Charles J Brauch
(74) *Attorney, Agent, or Firm* — David J. Cole (57) ABSTRACT

A radiation-assisted (typically solar-assisted) electrolyzer cell and panel for high-efficiency hydrogen production comprises a photoelectrode and electrode pair, with said photoelectrode comprising either a photoanode electrically coupled to a cathode shared with an anode, or a photocathode electrically coupled to an anode shared with a cathode; electrolyte; gas separators; all within a container divided into two chambers by said shared cathode or shared anode, and at least a portion of which is transparent to the electromagnetic radiation required by said photoanode (or photocathode) to apply photovoltage to a shared cathode (or anode) that increases the electrolysis current and hydrogen production.

16 Claims, 6 Drawing Sheets

(51) Int. Cl.
  *C25B 1/04* (2021.01)
  *C25B 11/00* (2021.01)
  *H01M 14/00* (2006.01)
  *C25B 9/70* (2021.01)
  *B01D 19/00* (2006.01)
  *C25B 11/087* (2021.01)
  *C25B 11/049* (2021.01)
  *C25B 9/50* (2021.01)
  *C25B 11/061* (2021.01)
  *C25B 11/063* (2021.01)
  *C25B 11/065* (2021.01)
  *C25B 11/077* (2021.01)
  *C25B 11/042* (2021.01)
  *C25B 11/043* (2021.01)
  *C25B 11/046* (2021.01)
  *C25B 11/031* (2021.01)

(52) U.S. Cl.
  CPC .............. *C25B 9/70* (2021.01); *C25B 11/00* (2013.01); *C25B 11/031* (2021.01); *C25B 11/042* (2021.01); *C25B 11/043* (2021.01); *C25B 11/046* (2021.01); *C25B 11/049* (2021.01); *C25B 11/061* (2021.01); *C25B 11/063* (2021.01); *C25B 11/065* (2021.01); *C25B 11/077* (2021.01); *C25B 11/087* (2021.01); *C25B 11/091* (2021.01); *H01M 14/005* (2013.01); *Y02E 10/52* (2013.01); *Y02E 60/36* (2013.01)

(58) Field of Classification Search
  CPC ... C25B 11/042; C25B 11/043; C25B 11/046; C25B 11/049; C25B 11/061; C25B 11/063; C25B 11/065; C25B 11/077; C25B 11/087; C25B 11/091; B01D 19/0031; H01M 14/005; Y02E 10/52; Y02E 60/36
  See application file for complete search history.

(56) References Cited

U.S. PATENT DOCUMENTS

| | | |
|---|---|---|
| 5,637,423 A | 6/1997 | Ovshinsky et al. |
| 6,017,655 A | 1/2000 | Ovshinsky et al. |
| 7,485,799 B2 | 2/2009 | Guerra |
| 8,673,399 B2 | 3/2014 | Guerra et al. |
| 2014/0332455 A1* | 11/2014 | Andrews .................. C02F 9/00 210/200 |
| 2015/0167179 A1 | 6/2015 | Juergen et al. |
| 2016/0186342 A1 | 6/2016 | Akihiko et al. |
| 2016/0376713 A1 | 12/2016 | Akihiko et al. |
| 2019/0169760 A1 | 6/2019 | Akihiko et al. |

FOREIGN PATENT DOCUMENTS

| | | | |
|---|---|---|---|
| JP | 56-20176 B2 | 11/2014 | |
| JP | 2017-228351 A | 12/2017 | |
| WO | WO-2012090390 A1 * | 7/2012 | ......... C01B 21/0821 |
| WO | WO-2016187287 A1 * | 11/2016 | ........... H01G 9/2031 |
| WO | 2018033886 A | 2/2018 | |

OTHER PUBLICATIONS (English translation of) Office Action issued on corresponding Japanese Application No. 2022-507646 dated Oct. 12, 2022.

* cited by examiner

RADIATION-ASSISTED ELECTROLYZER CELL AND PANEL

REFERENCE TO RELATED APPLICATION

This application claims priority of provisional Application Ser. No. 62/922,418, filed Aug. 8, 2019. The entire disclosure of this copending application and of all pending and published U.S. patent applications and patents referred to below is herein incorporated by reference

FIELD OF THE INVENTION

The present invention relates to a radiation-assisted electrolyzer for efficient production of, for example, hydrogen, comprising (i) at least a photoanode, a cathode, and an anode, or (ii) at least a photocathode, an anode, and a cathode, and a container which is divided into at least two separate chambers by the said cathode in Case (i), or by the anode in Case (ii), and further in which said chambers further contain at least one electrolyte, at least one gas separator, and at least one photocathode, photoanode, anode, or cathode, and at least a portion of which said container is transparent to the electromagnetic irradiation required by said photoanode or photocathode to be electrically photoactive, such that when said photoanode is irradiated and electrically connected to said cathode while an electrical potential is applied between said cathode and said anode, or when said photocathode is electrically connected to said anode while an electrical potential is applied between said anode and said cathode, said electrolyte is electrolyzed into at least two gaseous products at an electrolysis rate higher than that obtained without said irradiated photoanode or photocathode.

BACKGROUND OF THE INVENTION

As is well known in the art, electrolysis with either alkaline or polymer electrolyte membrane or proton exchange membrane (P.E.M.) electrolyzers can employ a variety of electrodes and a variety of electrolytes to produce a variety of chemical products. In one example, an electrical potential applied between an anode and a cathode that are separated by a gas separator or a P.E.M. in an electrolyte that is solid or aqueous produces hydrogen at the cathode and usually oxygen (depending on the potential applied, the electrode, and the electrolyte) at the anode. The latter oxygen production is, for hydrogen production purposes, a parasitic energy loss. Further, the reaction rate of the oxygen production is considerably slower than the hydrogen production, and so electrolysis rate of reaction and the flow of hydrogen is governed by, and restricted by, the oxygen production rate. Anything that can be done to increase the oxygen reaction rate, therefore, will also increase the electrolysis efficiency and rate of hydrogen production. Electrolysis efficiency is important because the predominant cost of products, such as hydrogen, produced by electrolysis is the high cost of the electricity required. Further, higher electrolysis efficiency is desired to reduce the carbon footprint in the production of hydrogen and other electrolysis products. Electricity from the "grid" has a typical carbon footprint of 0.6 kilograms (kgs) per kilowatt-hour of electrical power (this is a national average as is higher or lower by state). So reducing the electrical power lowers the cost and the carbon footprint of hydrogen and other electrolytic products.

Although a comprehensive understanding of the often-competing nuances and factors affecting electrolyzer design, operation, and efficiency can be difficult to achieve, electrolysis is elegantly simple in its basic operation: negative and positive electrodes are spaced apart in an electrolyte that can be an acidic, alkaline, or ionic fluid, or solid P.E.M. Upon application of an electrical potential across electrodes in an aqueous alkaline electrolyte, the negative electrode M electrochemically produces hydroxy ions $OH^-$:

$$M + H_2O + e^- \leftrightarrow M + OH^- \tag{1}$$

The negative electrode (or cathode) reactions are reversible.

The reactions that take place at the positive electrode (or anode) of an electrolyzer are (shown for a nickel hydroxide anode example):

$$Ni(OH)_2 + OH^- \leftrightarrow NiOOH + H_2O + e^- \tag{2}$$

Hence, the hydrogen production process for a nickel hydroxide positive electrode in an alkaline electrolyzer is governed by the following equation:

$$Ni(OH)_2 + OH^- \rightarrow NiOOH + H_2O + e^- \tag{3}$$

The hydrogen production efficiency, or electrolysis efficiency of the positive electrode and the utilization of the positive electrode material is effected by the energy-parasitic oxygen evolution process which is controlled by the reaction:

$$2OH^- \rightarrow H_2O + 1/2 O_2 + 2e^- \tag{4}$$

During the electrolysis, a portion of the current applied to the electrolyzer for the purpose of producing hydrogen in this case, is instead consumed by the oxygen evolution reaction (4). The oxygen evolution of equation (4) is not desirable because it contributes to lower hydrogen production rates.

One reason both reactions (oxygen and hydrogen evolution) occur simultaneously is that their electrochemical potential values are very close. Anything that can be done to widen the gap between them, lowering the nickel (or anode) electrochemical potential in reaction (3) or raising the electrochemical potential of the oxygen evolution reaction (4), will result in a higher rate of hydrogen production. And while the focus here is electrolysis, it will be seen that improving the oxygen reaction rate will also be of benefit to other electrochemical devices, such as batteries and fuel cells, for example. It is noted that the electrochemical potential of the oxygen evolution reaction (4) is also referred to as the oxygen evolution potential. U.S. Pat. No. 6,017,655 is one attempt to widen this gap by use of disclosed additives to the nickel hydroxide anode.

Another way that is disclosed herein is to assist the production of oxygen at the anode with sunlight, so that it has a faster reaction rate and less parasitic effect on the hydrogen production, by adding a photocatalytic anode, or photoanode, opposite a cathode that is shared with an anode, with said cathode disposed between the photoanode and the anode and sealed to the electrolyzer container to prevent parasitic flow of ions between the photoanode and the anode. When activated by light of the energy hv required by the semiconductor photoanode, where h is Plank's Constant and v is the frequency of that light, and connected electrically to the shared cathode, the photoanode produces a photo-voltage potential between it and the cathode that in turn reduces the electrochemical potential required between the cathode and the anode by an equivalent amount, while simultaneously producing oxygen and, at the cathode, hydrogen. In general, photoanodes (and also photocathodes) are semiconductors, modified semiconductors, or semiconductor compounds in monolithic form, or paste on monolithic form, that absorb and then convert photons of light into pairs of surface charges that can either electrolyze water directly or reduce the voltage normally required for electrolysis. Ideally such semiconductor photoanodes have conduction and valance band edges that overlap either the hydrogen evolution potential, the oxygen evolution potential, or both. If both, then spontaneous water electrolysis occurs when the photoanode is illuminated; this is known as photolysis. Otherwise a bias voltage or overpotential voltage, even though it can be considerably less than the theoretical 1.48 VDC electrolysis potential, is still required to initiate electrolysis by bridging the gap between either band edge and its respective evolution potential, in which case the process is called photoelectrochemical hydrogen production. For example, U.S. Pat. No. 7,485,799 to Guerra, and U.S. Pat. No. 8,673,399 to Guerra et al disclose photoanodes in which nanostructures strain a semiconductor such as titanium dioxide (titania or TiO2) such that the bandgap of the semiconductor is altered to favorably absorb more of the solar spectrum and also the band edges are more favorably aligned with the hydrogen and/or oxygen evolution potentials.

So semiconductor photoanodes, when illuminated with light having energy hv greatly reduce or even eliminate the applied electrical potential (or voltage) required because a band edge is either close to or overlaps the oxygen and/or hydrogen evolution potential(s). Absorption of the light energy forms charge pairs of electrons (e−) and holes (p+) at the semiconductor surface (SC) as in (5) below.

$$h\nu + SC \rightarrow (e^- + p^+) \quad (5)$$

Except that the electrons and positive charges arise from interaction of light with the semiconductor photoanode rather than from an external applied electrical potential, the governing reaction for oxygen evolution (6) can be seen to be identical with (4) above for a conventional anode:

$$2p^+ + 2OH^- \rightarrow H_2O + 1/2O_2 \quad (6)$$

A characteristic of semiconductor photoanode and photocathode electrodes that is of integral importance to the invention disclosed herein is that they are diodes, and more specifically they are therefore photodiodes. A photoanode can only function to produce photovoltage when electrically connected to a cathode that is in turn electrically connected to the negative terminal of a direct current (D.C.) power supply, and conversely, a photocathode must be electrically connected to an anode that is in turn electrically connected to the positive terminal of a D.C. power supply. In either case it will be understood that the electrodes are immersed in a common electrolyte. A further characteristic of a photodiode that is equally important to the operation of this invention is that photodiode photocurrent reaches a peak at a certain applied voltage, and will not increase thereafter with additional applied voltage.

It can be seen then that an alkaline electrolyzer, as well as other electrochemical devices, can be improved by addition of a photoanode (or photocathode). Presently, external electricity applied to the anode, such as nickel or nickel hydroxide for example, and typically stainless steel cathode produces, from the aqueous electrolyte, hydrogen at the cathode and oxygen at the anode. The theoretical voltage required to split the water in the electrolyte is 1.23 VDC (direct current volts). However, the overvoltage that is required to overcome the oxygen potential brings the actual theoretical voltage to 1.48 VDC. An electrolyzer that can produce hydrogen with 1.48 VDC would then have a Faraday efficiency of 100%. In practice, many commercial electrolyzers are only 50% efficient, requiring nearly 3.0 VDC, to 75% efficient, requiring 2.0 VDC. Similarly, in another electrochemical device, the electrolysis efficiency during the charging cycle in a typical Ni-MH (nickel metal hydride) battery is about 66%. This is because there are additional losses from resistance of the electrolyte, capacitance layers that form at the electrode surfaces (polarization) that slow down the rates of reaction, and further losses from the bubble formation of gaseous products that again increases resistance. Addition of a photocatalytic anode, or photoanode, will be seen to reduce or even eliminate the amount of electrical power required to electrolyze water to produce hydrogen. Light works with the photocatalyst to either electrolyze the water directly, with no external electrical power required, in so-called "zero bias" or photolytic mode, or with significantly reduced electrical power in photoelectrochemical mode. For example, the photoanode taught in U.S. Pat. No. 8,673,399 is able to produce hydrogen from water even without external electricity, i.e. spontaneously. The same photoanode has maximum hydrogen production with only 0.9 VDC additional potential supplied by an external electrical direct current DC power supply. Compared to the 1.48 VDC minimum electrolysis Faraday voltage required for electrolysis of water leads to the conclusion that the illuminate photoanode is producing a photovoltage of at least 0.6 VDC (the difference of 1.48 V and 0.9 V). And in fact, direct measurement of the photovoltage between such a photoanode and the cathode shows −0.6 VDC to as much as −0.85 VDC depending on the solar irradiation level. It will be seen that connecting such a photoanode electrically to a conventional cathode and anode pair, with the cathode shared electrically and placed physically in between the photoanode and the anode results in an electrical power requirement half to a third of that required by a conventional alkaline or P.E.M. (polymer electrolyte membrane or proton exchange membrane) electrolyzer, respectively, to produce an equivalent amount of hydrogen. For example, the higher heating value of hydrogen gas, expressed as a kilo-watt hour per normal cubic meter (kWh/Nm3) is 3.54 kWh/Nm3, where "normal" means it is measured at 0° C. temperature and 1 atmosphere (ATM) pressure. A commercial alkaline electrolyzer typically requires 4.8 kWh to produce a normal cubic meter of hydrogen gas, yielding an electrolysis efficiency on an electrical energy basis of 74% (obtained by dividing 3.54 kWh by 4.8 kWh). A P.E.M. electrolyzer typically requires 5.8 kWh, for an efficiency of 61%. A solar-assisted electrolyzer, in one embodiment taught in this specification, requires only 1.6 kWh to produce a normal cubic meter while illuminated with sunlight of 820 W/m2 or watts per square meter (typical of Boston in summer near astronomical noon) and at 60° C. (an average stagnation temperature inside a solar-assisted electrolyzer panel). On an electrical energy basis, this is 221% (3.54 kWh divided by 1.6 kWh). This is possible because the extra energy is being provided by sunlight and the photocatalytic photoanode: the first law of thermodynamics is not broken as total energy is conserved. That said, consider a utility that would like to store a kilo-watt hour of excess electrical power, especially if from an intermittent renewable energy source, for use later "on demand". That kWh can power an electrolyzer to split water into hydrogen that is then stored for later used to produce electricity via a fuel cell. For the alkaline electrolyzer with efficiency 74% and a fuel cell with typical efficiency 45%, the round-trip (R-T) efficiency is 33.3%. The utility will only be able to retrieve 0.33 kWh of the kWh that they stored, losing ⅔ or 0.66 kWh to efficiency losses.

However, a solar-assisted electrolyzer, with an efficiency of 221% on an electrical energy basis, will return, with that same fuel cell, a R-T efficiency of 99.5%. The utility will be able to retrieve essentially all of the power that it stored, and the storage is nearly lossless.

Therefore the present invention provides a radiation-assisted electrolyzer that employs photoanodes, such as those just described, or any other photoanodes and/or photocathodes known in the art or yet to be invented as well, for electrolysis that requires less electrical power to produce electrolytic products, and in particular for more efficient electrolysis of aqueous electrolytes into hydrogen. In addition to electrolyzing water to produce hydrogen, the invention herein disclosed is more broadly solar-assisted electrochemistry that can produce many other valuable electrolytic products, including even electrolytic and/or photocatalytic synthesis of liquid fuels. Solar-assisted electrochemistry similarly is applied to electrochemical devices other than electrolyzers, such as fuel cells, batteries, and electrochemical sensors.

In addition to the photovoltage supplied by the photoanode or photocathode, there can also be photothermal gain included in the "solar-assistance" of which the benefits to the electrolysis efficiency will be described in detail below.

SUMMARY OF THE INVENTION

The present invention seeks to provide a radiation-assisted electrolyzer that employs light, a photoelectrode, and an electrode to reduce the amount of external electricity required for electrolysis and other electrochemical devices, wherein said photoelectrode comprises a photoanode electrically connected to a cathode when used versus an anode electrode, or a photocathode electrically connected to an anode when used versus a cathode electrode, with one application being electrolytic production of hydrogen from sunlight and water with high electrolysis efficiency on an electrical energy basis.

Accordingly, the present invention provides an electrolyzer cell comprising:
 a) a container capable of retaining a liquid electrolyte;
 b) a photoelectrode, a first electrode, and a second electrode, wherein either (i) the photoelectrode is a photoanode, the first electrode is a cathode, and the second electrode is an anode, or (ii) the photoelectrode is a photocathode, the first electrode is an anode and the second electrode is a cathode, the first electrode dividing the container into separate first and second chambers each capable of retaining a liquid electrolyte, the photoelectrode being disposed in the first chamber and the second electrode in the second chamber;
 c) said container permitting at least a portion of radiation impinging thereon to reach the photoelectrode;
 d) the container having a first aperture arranged to remove gas generated at the first electrode and at least one second aperture arranged to remove gas generated at the second electrode and/or the photoelectrode;
 e) the photoelectrode being electrically connected to the first electrode, and a voltage source being arranged to provide a voltage difference between the first and second electrodes.

This electrolyzer cell of the present invention may further comprise a first gas separator disposed within the first chamber between the photoelectrode and the first electrode, and a second gas separator disposed within the second chamber between the first electrode and the second electrode, the first and second gas separators preventing passage of gas bubbles therethrough but permitting passage of electric current therethrough. The photoelectrode may be provided with louvers or apertures, and/or may absorb radiation into at least the near infra red, thereby having the ability to heat an electrolyte in the container. The electrolyzer cell of the present invention may further comprise an optical irradiation concentrator in the form of a Fresnel lens or a cylindrical reflector arranged to direct radiation on to the photoelectrode. When present, the gas separators may comprise a non-woven felt of polyolefin. The surfaces of the gas separators, when present, may be treated to prevent or reduce gas bubbles from sticking thereto. The first and second chambers may contain two electrolytes differing in chemical composition, and the photoelectrode may function as a diode.

This invention also provides a method of effecting electrolysis, the method comprising:
 providing an electrolyzer cell of the invention;
 placing an electrolyte in the first and second chambers of the cell; and
 applying a voltage between the first and second electrodes while exposing the photoelectrode to radiation.

This invention also provides an electrochemical cell comprising an anode electrode, a cathode electrode, a first electrolyte in contact with the anode and cathode electrodes, and voltage control means for applying a potential difference between the anode and cathode electrodes and/or receiving voltage generated by the electrochemical cell, thereby effecting an electrochemical reaction at the electrodes, wherein one electrode comprises:
 a container;
 a second electrolyte disposed within said container;
 a photoelectrode of opposite polarity to said one electrode and disposed within said container in contact with said second electrolyte, said photoelectrode being arranged to receive radiation impinging upon said electrochemical cell; and
 an electrically conductive member on the exterior surface of said container in contact with said first electrolyte, and electrically connected to said photoelectrode.

This invention also provides an electrochemical cell comprising an anode electrode, a cathode electrode, an electrolyte in contact with the anode and cathode electrodes, and voltage control means for applying a potential difference between the anode and cathode electrodes and/or receiving voltage generated by the electrochemical cell, thereby effecting an electrochemical reaction at the electrodes, wherein at least one electrode is a photoelectrode arranged to receive radiation impinging upon the exterior of the electrochemical cell and to absorb infra-red radiation and heat the electrolyte, thereby improving electrolysis efficiency.

BRIEF DESCRIPTION OF THE DRAWINGS

The structure and operation of the invention, together with the objects and advantages thereof, may best be understood by reading the detailed description to follow in connection with the drawings in which unique reference numerals have been used throughout for each part and wherein.

DETAILED DESCRIPTION OF THE INVENTION

Disclosed herein is a radiation-assisted (typically solar-assisted) electrolyzer cell used singly or in multiples to form a radiation-assisted electrolyzer panel. The electrolyzer cell comprises a photoelectrode, an anode, a cathode, optional gas separator means for keeping gas products separate while passing ions, and a container allows radiation impinging upon the container to reach the photoelectrode; typically, the container will comprises a window that is able to transmit at least the part of the electromagnetic spectrum required by the photoelectrode.

Figure 1:
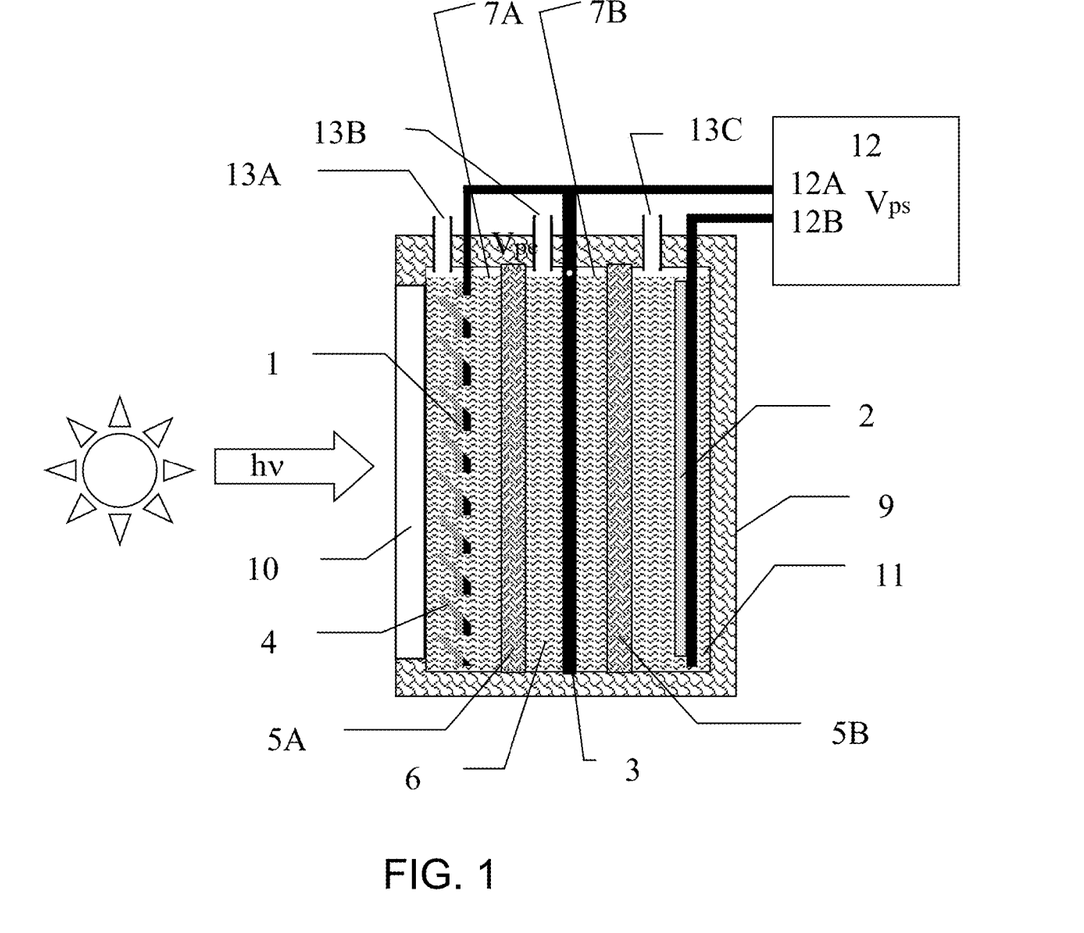
FIG. 1 is a schematic cross-section of the solar-assisted electrolyzer cell wherein photoanode and anode are opposite a common cathode, or photocathode and cathode are opposite a common anode.

Referring to FIG. 1, in a preferred embodiment the electrolyzer cell comprises a container 9 capable of holding a liquid electrolyte, and provided with a light-transmissive portion or window 10, which can be of ultraviolet transmitting (UVT) acrylic, borosilicate 3.3 glass, or other material. Further, the window 10 can be coated with anti-static, anti-reflection, heat-rejection, or other optical coatings and structures including but not limited to diffraction gratings and holographic concentrating or light-directing optics. For simplicity in illustration, the container shown is of a non-conductive material and so electrode-to-case isolation is not required or shown. However, it will be understood that the container can be comprised of any of the materials and lined materials now commonly used in the electrolyzer art, which can include materials that are electrically conductive. However, to fully take advantage of the solar heat gain within the container, and the benefits that that heat gain brings to the electrolysis efficiency, as discussed in detail below, the container should either be constructed of a material that has very good thermal insulation, such as a foam of polypropylene, or should be further coated or wrapped with a thermal insulation material including but not limited to fiberglass or structural foam board.

A first electrode (cathode) 3 is sealingly mounted within the container 9 so as to divide the interior of the container 9 into separate first and second chambers 7A and 7B respectively. A photoanode 1 is mounted within the first chamber 7A and a second electrode (anode) 2 is mounted within the second chamber 7B. A first gas separator 5A is sealingly mounted in the first chamber 7A between the photoanode 1 and the cathode 3, and a second gas separator 5B is sealingly mounted in the second chamber 7B between the cathode 3 and the anode 2. Gas separators 5A and 5B can be non-woven felts of polyolefin, polyethylene, polypropylene, or other, typically with thickness about 2 to 4 mm. Additionally, the gas separation means can have surfaces that are thermally, chemically, or otherwise treated to prevent or reduce gas bubbles from sticking to its surfaces. Gas separators 5A and 5B are sealed to the container 9. Where the container 9 is acrylic, one means of said sealing can be accomplished with solvent welding using thick acrylic solvent cement, for example. The gas separators 5A and 5B effectively divide the interior of the container into three electrolysis chambers which retain the gases generated at the photoanode 1, the cathode 2 and the anode 3 respectively. The upper end of the container 9 (as illustrated in FIG. 1) is provided with outlet apertures 13A, 13B and 13C to remove the gases generated from the photoanode 1, the cathode 2 and the anode 3 respectively.

The photoanode 1 and anode 2 each have their own conductive electrode bases, which may comprise titanium, nickel, carbon, graphite, or other conductive material suitable for the alkaline environment, upon which additional materials may be added for enhanced performance. Anode 2 material can be nickel hydroxide on nickel or on stainless steel, mixed metal oxides on titanium (MMO), plated nickel or nickel hydroxide film on titanium, nickel or nickel hydroxide particles on titanium or on stainless steel, or other suitable anode. Louvers or other apertures 4 are formed into photoanode 1 in order to provide an ion path between the illuminated surface of the photoanode (adjacent the window 10) and the cathode 2. Louvers are advantageous over simple apertures, for example, because no light-receiving photoanode surface is lost. The photoanode is continuous physically and electrically, but appears segmented in FIG. 1 because this Figure is a section in a plane passing through the louvers 4.

The cathode 3 may comprise 316 stainless steel, graphite, or nickel or stainless steel foam ribbon, for example.

The first chamber 7A contains an electrolyte 6 which contacts the photoanode 1, the first gas separator 5A, and one side of the cathode 2, while the second chamber 7B contains an electrolyte 11 which contacts the opposed side of the cathode 2, the second gas separator 5B and the anode 3. Normally the same electrolyte would be used in each of the chambers 5A and 5B; however, because the cathode 2 is sealingly secured to the container 9, an opportunity is provided to fill one chamber with an electrolyte 11 and the other chamber with a different electrolyte 6, such that each electrolyte can be optimized for either the cathode-to-anode electrolysis, or the photoanode-to-cathode electrolysis. This degree of freedom in electrolyte choice afforded by the two distinct chambers separated by the cathode sealed to the container is especially important regarding selection of the photoanode (or photocathode). The ability to choose an electrolyte for the photoanode chamber can greatly impact photovoltage and/or photoanode lifetime. Further, multiple gaseous electrolysis products can be produced in this way from a single cell.

Both the container 9 and the window 10 are shown as substantially cuboidal in FIG. 1, but it will be understood that they can also have convex or concave cylindrical surfaces. The latter is useful in that it provides extra strength should excess pressure build up in the case, either upon failure of a vent, or to allow intentional higher-pressure operating conditions, while the former can provide an optically more efficient focal plane for an external light concentrator optic.

Although the electrolyzer cell has been described above as comprising a photoanode 1, a cathode 2 and an anode 3, it will be appreciated that the polarity of the electrodes may be reversed, so that the cell comprises a photocathode 1, an anode 2 and a cathode 3.

In operation, when sunlight illuminates the photoanode 1, a photo-potential or photovoltage $V_{pe}$ is produced between the photoanode 1 and the cathode 3, and hydrogen is produced at the cathode while oxygen is produced at the photoanode. Simultaneously, a potential Vps is applied between the same cathode 3 and the anode 2. A mutually beneficial synergistic effect arises from the fact that the cathode is electrically shared by the anode and by the photoanode and also because it separates the container into two distinct electrolyzer chambers: the cathode "appears" to be more negative to the anode by an amount equal to the photo-potential Vpe produced by the photoanode and sunlight. This is electrically the equivalent of adding voltage at the anode, such that the real potential between the anode and the cathode is Vps+Vpe. It is this added voltage that increases the oxygen production reaction at the anode, and hence increases the hydrogen production rate at the cathode. Meanwhile, there is additional hydrogen being produced on the other side of the cathode because of the photoanode and cathode coupling on that side in that chamber. And because the photoanode is a diode, or photodiode, it is isolated from the effect of the potential Vps at the shared cathode.

Figure 2:
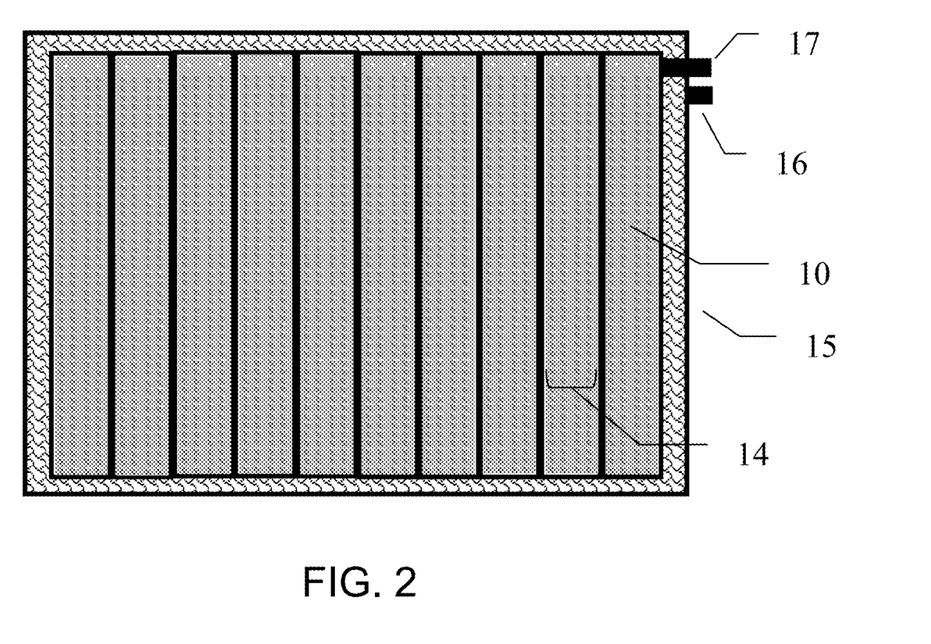
FIG. 2 is a frontal schematic view of a solar-assisted electrolyzer panel comprised of multiple connected cells.

Referring to FIG. 2, multiple solar-assisted electrolyzer cells 14 are mounted adjacent to form a planar solar-assisted electrolyzer panel 15 that can be positioned to face the light source. The louvered photoanodes (or photocathodes) are seen through the windows 10. Adjacent cells 14 can be connected electrically in series or in parallel, requiring a direct current DC power supply of either higher output voltage or of higher current capacity respectively. The power input connections 16 and 17 will be positive and negative, respectively, with negative connected to the photoelectrode and positive connected to the anode when the photoelectrode comprises a photoanode and cathode couple, and when the photoelectrode comprises a photocathode coupled to an anode, it will be connected to the positive terminal. Each cell 14 has a window 10 as previously described. Windows 10 can be an ultraviolet-transmissive (cast is preferred but extruded is acceptable) UVT acrylic that is produced by Evonic Degussa, Cyro, and others, or it can be borosilicate 3.3 glass from Schott and others. Though not shown in the figures, the window can further be coated with an anti-reflection coating, scratch-resistant coating, anti-static coating, or other optical coating such as a diffractive or holographic optical grating or other holographic optical structure. The remainder of the container can be solvent-welded, ultrasonically-welded, cast, or injection-compression molded acrylic or other plastic, or it can be steel or other metal suitable for the alkaline environment with or without linings. As with the container 9 in FIG. 1, container 9 here should also be fabricated from materials with high thermal insulation values, or further provided with applied thermal insulation in order to retain as much of the photothermal heating benefits for as long a duration as possible.

Figure 3:
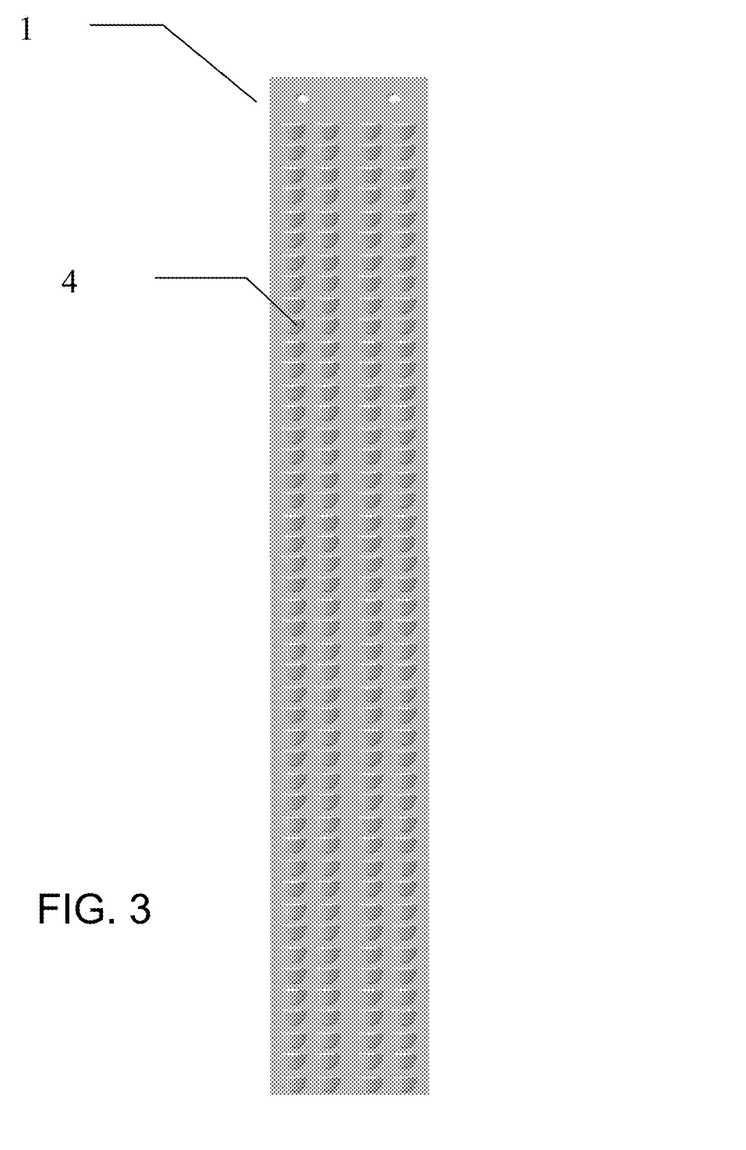
FIG. 3 is a frontal-view rendering of a photoanode (or photocathode) showing one arrangement and form of louvers

Referring to FIG. 3, one embodiment of photoanode 1 is shown with a multitude of louvers 4. Photoanode 1 may be any photocatalytic anode or photoanode material known in the art. More semiconductors give rise to photoanodes than to photocathodes, at least in terms of being inert to the electrolyte. Whether the semiconductor is p or n type is determined by several factors, including the addition of doping for example. That said, photocathodes inert to the electrolyte will surely be developed or are being developed now, and so it is within the scope of this present invention that the photoelectrode can comprise a photoanode electrically coupled to a cathode, or a photocathode coupled electrically to an anode. It is further within the spirit and intent of this invention that any and all kinds of photoanode materials may be used. Examples of possible photoanode materials are provided in U.S. Pat. Nos. 7,485,799 and 8,673,399, the contents of which are incorporated by reference herein, disclose photoanodes in which nanostructures strain a semiconductor such as titanium dioxide (titania or TiO2) such that the bandgap of the semiconductor is altered to favorably absorb more of the solar spectrum and also the band edges are more favorably aligned with the hydrogen and/or oxygen evolution potentials.

Additional photoanode 1 (and photocathode) materials, whether in the art or not, are also within the scope and spirit of this invention. They include but are not limited to (1) titania that is dyed to absorb light beyond that which is normally absorbed by titania, (2) titania that is doped with nitrogen, carbon, silicon, or other element, (3) strontium titanate, (4) compounds and alloys of titania and titanium with tungsten or tungsten oxide, cadmium sulfide, iron or oxides of iron, silicon, or other, (5) silicon seeded with protective nickel surface particles, (6) nanotubes of titanium dioxide further comprising dopants, dyes, or compounds as listed above, (7) carbon nanotubes further comprising semiconductor materials, (8) and graphene alone or combined with photoanode materials listed above, (9) photoanodes that incorporate either quantum dots or photonic bandgap crystals for enhanced light absorption, and (10) any or all of the preceding photoanode materials in combination with the strained titania photoanode taught in U.S. Pat. Nos. 7,485, 799 and 8,673,399

The material for the anode 2 may be any material known in the electrochemical arts of electrolyzers, batteries, or fuel cells. It is within the spirit and intent of this invention that any and all kinds of anode materials may be used. An example is nickel hydroxide, such as provided in U.S. Pat. Nos. 5,348,822 and 5,637,423 and 6,017,655 the contents of which are incorporated by reference herein.

The anode 2 may also comprise materials and anodes not now found in commercial electrolyzers as well as Ni-MH batteries. For example, a titanium metal base (rod, plate, sheet, foil, expanded mesh, or other) coated with mixed metal oxides (MMO, typically a mixture of oxides of ruthenium, titanium, and iridium) or with nickel or nickel hydroxide film or particles may also serve as a suitable anode. These anodes can have other conductive bases such as but not limited to carbon and graphite, or other conductive material that can function as either anode (during charging) or cathode (during discharging) in an alkaline environment. Means of manufacturing said anodes includes but is not limited to steps that may comprise one or more of applying a paste, sintering, calcification, thermal oxidation, anodizing, alloying, plating, powder coating, mechanical compression, casting, vacuum deposition, chemical vapor deposition, or other. Anodes formed with these or other processes and with these or other materials are within the spirit and scope of this invention.

In general, a solar-assisted electrolyzer cell comprises, just as an electrochemical cell or electrolyzer does, at least one positive electrode, at least one negative electrode, and an electrolyte surrounding the positive and negative electrodes. In addition, the solar-assisted electrolyzer cell further comprises at least one photoanode. The electrolyte 11 is an alkaline electrolyte which may comprise a potassium hydroxide solution (KOH) or a potassium carbonate solution (K2CO3), and may further comprise other electrolytes as well as additives and/or co-electrolytes for improved performance such as but not limited to low or high temperature performance, or more efficient gas release, or beneficial leak-containment properties such as viscosity or polymerization, or higher index of refraction. When a second different electrolyte 6 is employed, it can be acidic or alkaline and can be of a different chemical species than electrolyte 11. In this way the two separate electrolytes can be optimized for their particular chamber and electrodes.

The cathode electrode 3 can comprise one or more of 316 stainless steel in sheet or foam form, nickel foam ribbon, carbon, graphite, or titanium. It is within the spirit and intent of this invention that any and all kinds of materials and substrates may be used, including but not limited to those listed herein, that are known in the electrochemical arts of electrolyzers, batteries, and fuel cells, for example.

Figure 4:
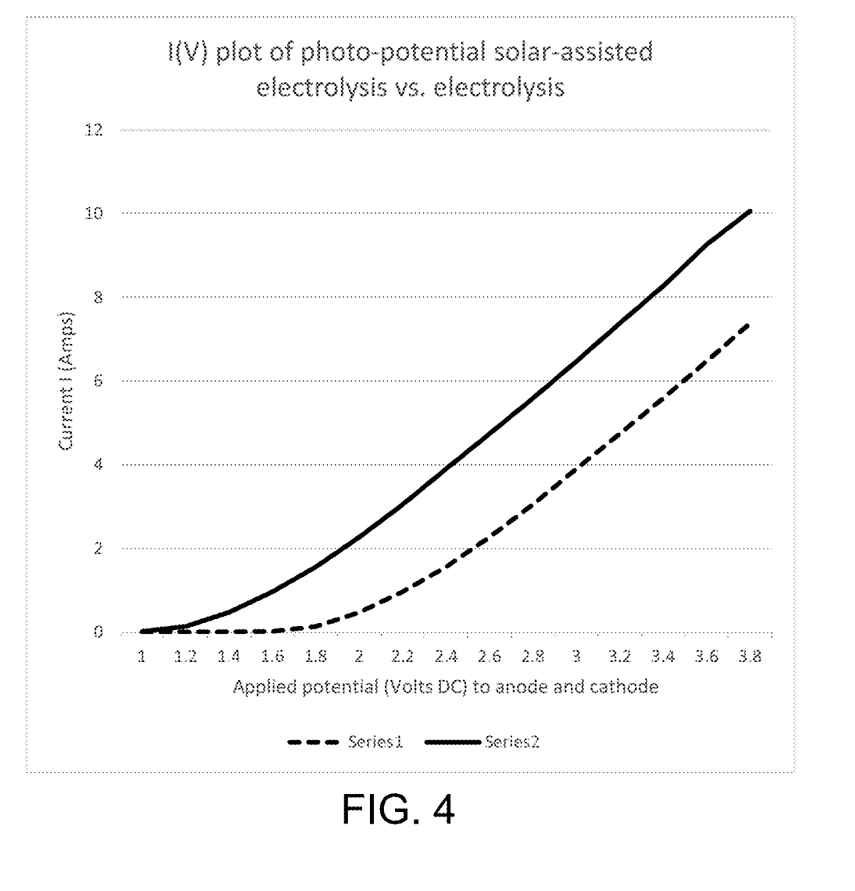
FIG. 4 is plot of measured electrolysis current I versus voltage V applied, or I(V) plot, of the solar-assisted electrolyzer cell showing the increase in electrolysis current that arises when the illuminated photoanode is in electrical contact with the shared cathode.

Referring to FIG. 4, the large effect on the electrolysis current of an additional photo-potential of 0.6 VDC achieved with, in this case, a photoanode in sunlight of 700 W/m2 versus a cathode of stainless steel that is shared with a nickel (200 alloy) anode is plotted and compared as current vs voltage, or I(V) plots. Series 1 is the I(V) plot for the anode and cathode operating as a conventional alkaline electrolyzer, and the voltage is applied to this pair of electrodes only. Series 2 is the I(V) plot with the photoanode electrically connected to the shared cathode and illuminated with sunlight. Current from the solar-assisted electrolyzer cell was measured with a Fluke ammeter connected between the shared cathode, which was sealed to the container as is taught in this present invention, and the direct current (DC) voltage supply provided a range of applied potential voltage between the anode and the cathode, specifically 1.0 VDC to 3.8 VDC in increments of 0.2 VDC. The photo-potential supplied by the photoanode was 0.6 VDC, but as is discussed herein elsewhere, this value depends on the solar irradiation and can be as high as 0.85 VDC for this particular photoanode. The electrolyte temperature was constant during this measurement and was 27° C. Therefore, this comparison illustrates the photo-potential contribution only and not the additional photothermic contribution that can be provided by the photoanode (or photocathode). It further does not include the direct production of hydrogen at the cathode side facing the photoanode. The physical area of the photoanode, cathode, and anode were all 8.6 cm×91 cm, or 786 cm2. The current is plotted is the raw value rather than the current density, which can be obtained by dividing by the area just provided if necessary.

Although the present invention has hitherto been described in connection with a solar-assisted electrolyzer cell, the present invention is much broader and extends to use of a photoelectrode that can be used in combination with other elements to apply solar-assistance to many other electrochemical devices, including but not limited to batteries, electrochemical sensors, and fuel cells. In this last case of fuel cells, for example, the advantages of electrically contacting a photoanode to a cathode that is shared with a conventional anode, or of a photocathode to an anode that is shared with a conventional cathode, can also be applied to the reverse of electrolysis, namely the combining of hydrogen and oxygen in a fuel cell to produce electricity and water. Fuel cells suffer from low efficiency, from as low as 45% to only about 60%, for substantially the same reason as in electrolysis: the slow rate of the oxygen reaction that therefore governs the final fuel cell efficiency. Combining a photoelectrode apparatus with a fuel cell will similarly increase its efficiency when illuminated.

Figure 5:
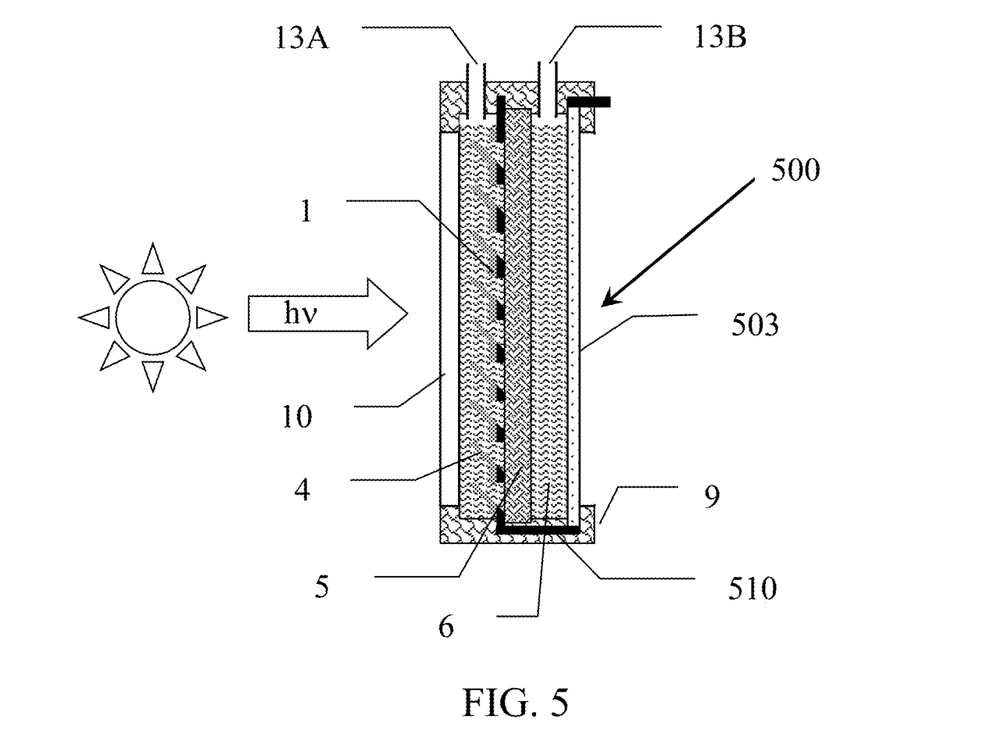
FIG. 5 is a schematic cross-section of the photoelectrode comprising photoanode and cathode or photocathode and anode.

FIG. 5 illustrates a photoelectrode apparatus (generally designated 500) which is intended to serve as the cathode in an electrochemical cell also comprising an anode electrode, a first electrolyte in contact with the anode and cathode electrodes, and voltage control means for applying a potential difference between the anode and cathode electrodes, thereby effecting an electrochemical reaction at the electrodes. The photoelectrode apparatus comprises a container 9 within which is retained a liquid second electrolyte 6. The container 9 further comprises a window 10 and gas outlets 13A and 13B for collection of gas generated during electrolysis. Part of the surface of the container 9 is formed by an electrically conductive member 503, which is in contact with the first electrolyte (not shown) and serves as the actual cathode of the electrochemical cell. A photoanode 1 is disposed within the container 9 in contact with the second electrolyte 6 and is permanently connected to the conductive member 503 by a connector 510 passing through the base of the container 9. When light with energy hv illuminates the photoanode through window or transparent portion 10, the connector 510 places a photo-potential on the conductive member 503. It will be appreciated that if the photoelectrode apparatus 500 is intended to serve as an anode, the photoelectrode would be a photocathode. In this way, for any electrochemical device that requires two electrodes, this photoelectrode apparatus can be substituted for at least one of said electrodes, with the added benefit that it instantly, when illuminated provides electrical bias for improved electrical efficiency of said electrochemical device.

It is further intended to claim in this disclosure the full scope of the solar-assistance that can be brought to bear on electrochemical devices such as electrolyzers, batteries, fuel cells, and electrochemical sensors. This broader scope includes photothermal efficiency gains in addition to photo-potential gains, either singly or together. For example, photoelectrodes that produce beneficial photo-potential may also simultaneously make photothermal contributions to electrochemical efficiency by absorbing more of the solar spectrum that, becoming heated, and transferring that heat to the electrolyte and other electrodes. The photoanode discussed earlier in Guerra and in Guerra et al is one such example of a photoanode that is engineered to absorb the ultraviolet (UV) and blue high energy part of the solar spectrum for spontaneous water splitting, but continues to have significant absorption into the near IR (NIR). This latter absorption does not contribute to its photocatalytic abilities, at least directly. But the heating effects on the electrolyte and other electrodes results in significant gains in hydrogen production and electrolysis efficiency. But photoelectrode can be photothermic only and still improve the efficiency of the electrochemical device even in the absence of photo-potential. A brief discussion of the impact of electrolyte temperature on electrochemical efficiency is first warranted. Earlier, the relation given in this specification wherein 1 ampere of electrolysis current is proportional to 7 sccm (standard cubic centimeters per minute) flow of hydrogen gas is given for standard pressure and standard temperature of 20° C. Raising the temperature of the electrolyte and electrodes by a modest 40° results in nearly a 20% increase in this flow rate (the actual relation is on the Kelvin scale rather than Celsius, hence the 20% increase). Such an increase in temperature to 60° C. and more is easy to achieve with sunlight at any time in the year with a well-designed cell and panel, and requires only that the photoelectrode can absorb deeper into the solar spectrum and into the near infra red (NIR) and infra red (IR) than is normally used for photo-potential creation. It is important that the electrolyte not reach boiling point, as that would decrease electrolysis efficiency at the electrolyte/electrode boundary. But at the modest temperature increases discussed herein, in combination if necessary, with increased pressure and/or electrolyte concentration, boiling can be controlled and avoided. But in addition to the approximately 20% to 30% increase from the relation of amperes to hydrogen flow, an increase in temperature brings other more pedantic efficiency improvements that in sum are more important than the 20% increase: (1) the conductance of the electrolyte increases with temperature, and resistance decreases, for higher efficiency (2) the overpotential of conventional electrode materials decreases with temperature (3) the increased dynamics in the electrolysis cell that come with heating reduce the capacitance and polarization effects at the electrolyte/electrode boundary, and (4) the gas products bubble and release more quickly from the electrodes, thereby reduced what is known as "void fraction resistance".

Figure 6:
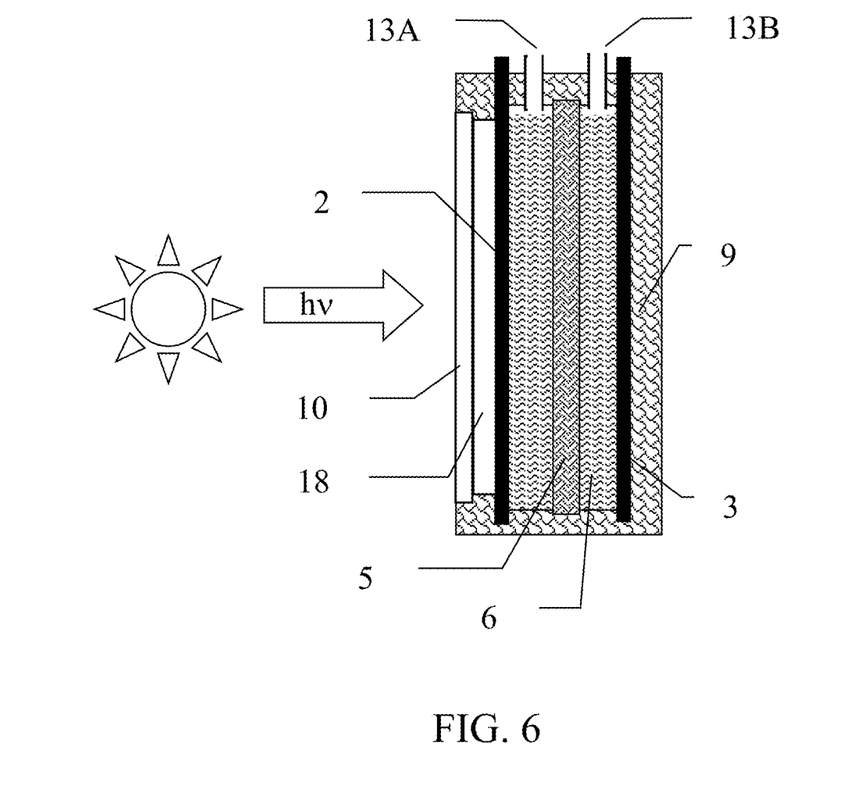
FIG. 6 is a schematic cross section of a variation of solar-assisted electrolyzer that employs a photothermal electrode, for photothermal electrolysis.

A photothermic solar-assisted electrolyzer is shown in FIG. 6. While it should be clear from the preceding discussion that the solar-assisted electrolyzer in FIG. 1 may also be photothermic in that the photoanode 1 can provide both photo-potential as well as photothermal heating, the device herein is photothermic only. Hence, it only requires two electrodes, at least one of which is heated by solar irradiance and thereby transfers heat to the electrolyte and the other electrode. As before, there is a container 9 with electrolyte 6, gas separator 5, gas fittings 13A and 13B for collection of gas products from the electrolysis, window or transparent portion 10, cathode 3, and anode 2. However, here anode 2 further comprises a coating that enhances photo-absorption and heating. Such coatings are well known in the art of thermal flat plate solar collectors and of course are not claimed here. There is also provided stagnant air volume 18 which, again as with thermal flat plate solar collector panels, enhances the heating effects. The window 10 can also comprise coatings to enhance heating, and in fact window 10 can comprise at least two sheets of glass or similar material with additional coatings, filling with argon or other gases, and additional membranes within to further enhance the heating effects. Again, all of these techniques are well known in that art and are not claimed here, only their use in combination with a solar-assisted electrolyzer in which said solar-assistance is a photothermic electrode that absorbs sunlight to heat the electrolyte and other electrode.

EXAMPLE

The following Example will illustrate the advantages of a solar-assisted electrolyzer that embodies both photo-potential contribution as well as photothermal contribution to "solar-assistance", in that the photoanode employed has both properties. A separate drawing is not provided because it closely follows the schematic provided in FIG. 1. A solar-assisted electrolyzer cell comprising (1) a photoanode as taught in U.S. Pat. No. 8,673,399 comprising strained titanium dioxide on grade 1 titanium base, (2) a commercially available anode comprised of nickel sheet or ribbons of mixed metal oxide (MMO) coating on titanium base, (3) gas separators comprising non-woven polyethylene felt, (4) a cathode comprising 316 stainless steel sheet, and (5) a container comprising solvent-welded ultraviolet-transmissive cast acrylic cylinder. The cell outer dimensions are 10 cm O.D. by 1.0 meter height, and the acrylic wall thickness is 6 mm. The cell further comprised gas fittings to connect collection tubes for the hydrogen and oxygen, which also allow electrolyte fill. Both potassium hydroxide (KOH @ 26%) as well as potassium carbonate ($K_2CO_3$ @ 20% by weight) were tested as electrolytes individually and found to be satisfactory, with KOH providing about 10% added performance but at the cost of being caustic to some of the materials used. Two grade 2 titanium contacts and one 360 stainless steel contact protrude through the cell endcap and allow the photoanode, anode, and cathode respectively to be accessed electrically through the sealed case in order to apply a potential across the anode and cathode and then to measure the I(V) performance with the photoanode connected to the cathode and with it disconnected. The light source was natural sunlight of about 700 watts per square meter (Concord, Mass. at astronomical noon in May) as measured with a Thor Labs radiometer. However, results similar to those in this example were also obtained with a solar simulator from Oriel. The temperature of the electrolyte was monitored and kept equal when comparing the electrolysis current and hydrogen evolution with the photoanode connected to the cathode and with it disconnected from the cathode, as well as with light on and light off. The photovoltage produced by the photoanode to cathode was measured as high as 0.85 VDC but was more typically 0.6 VDC, as this value is sunlight-dependent. The electrolysis current (i.e., hydrogen production) between the stainless steel cathode and the anode, whether MMO or nickel, increased by over 50% with the illuminated photoanode electrically connected to the cathode. With the photoanode disconnected or covered, the increase in current could only be matched by increasing the applied voltage between the cathode and anode by an amount equivalent to the photovoltage contributed by the photoanode. This confirms that the photoanode's effect on the shared cathode is to make it have a more negative potential with respect to the anode, which is the same as increasing the positive potential on the anode/cathode pair. Further, the photoanode produces oxygen all the while, thereby further increasing the hydrogen production at the cathode. It is important to note that this 50% increase is from photovoltage only. In fact, the same photoanode yields a photothermic contribution as well because of its high optical absorption into the near infra red (NIR). As a result, the electrolysis current was seen to also increase 50% in this same cell at 45° C. over the conventional anode/cathode baseline electrolysis at 20° C. So in this example the total solar-assist was 100%: hydrogen production was 2× that of the conventional alkaline electrolyzer, and so only half of the electrical power was required per unit of hydrogen produced. And with solar irradiation greater than 700 W/m2 and stagnation temperature higher than 45° C., the values in this example, the required electrical power can be as low as a third.

This example is simply one illustration of the advantages of this invention, and in no way is meant to limit the scope of this invention or to exclude the use of other photoanodes, anodes, cathodes, electrolytes, gas separator materials, window materials, or containers. For example, a non-woven polyolefin or non-woven polypropylene felt can also be used as gas separator(s), the photoanode can be any of the photoanodes discussed in this specification as well as any other photoanodes including but not limited to dyed titania, doped titania, tungsten, cadmium sulfide, any of the iron oxides, titania alloyed or compounded with cadmium sulfide or tungsten or any of the iron oxides, silicon with nickel coating, and photoanodes comprising in part graphene or carbon nanotubes, the conventional anode can be nickel hydroxide as in commercial Ni-MH batteries or nickel plated onto titanium as film or particles as described earlier in this specification, the cathode can comprise the standard cathode found in commercial alkaline electrolyzers, including stainless steel, or graphite. And the container can be a metal case and the transparent window can be borosilicate 3.3 glass. Similarly, the size can be larger or smaller or thinner or thicker.

Many photoanodes are able to operate at light concentrations of 10 suns and more. Some photoanodes' hydrogen production is linear with concentration up to 10 suns, after which hydrogen production increases more slowly, but even so the use of an optical concentrator may be beneficial to the economics or performance of the solar-assisted electrolyzer cell. The scope of the present invention therefore includes combining the solar-assisted electrolyzer cell claimed herein with an optical concentrator such that sunlight or other light source is collected, concentrated, and used to illuminate the photoanodes in said invention. Examples of optical concentrators include but are not limited to Fresnel lenses, parabolic reflectors, elliptical reflectors, and non-imaging optics, all either of rotational or cylindrical form.

Finally, it should be noted that both the photothermal and the photo-potential contributions to the efficiency of the solar-assisted electrolyzer continue well after sun-down and in fact into the night. A well-insulated container and panel will retain the solar heating for many hours after dark. And the photo-potential is also stored, in that the electrolyte, being saturated with gases, now operates similarly to a fuel cell or battery. Therefore, not only can external electrical power continue to be applied to the anode and cathode for non-stop hydrogen production through the night, but moreover with substantial electrolysis efficiency benefits from the day's sunlight only slowly decaying through the night as the electrolyte cools and the photo-potential drains.

I claim:

1. An electrolyzer cell comprising:
   a. a container capable of retaining a liquid electrolyte;
   b. a photoelectrode, a first electrode, and a second electrode, wherein either (i) the photoelectrode is a photoanode, the first electrode is a cathode, and the second electrode is an anode, or (ii) the photoelectrode is a photocathode, the first electrode is an anode and the second electrode is a cathode, the first electrode dividing the container into separate first and second chambers each capable of retaining a liquid electrolyte, the photoelectrode being disposed in the first chamber and the second electrode in the second chamber;
   c. said container permitting at least a portion of radiation impinging thereon to reach the photoelectrode;
   d. the container having a first aperture arranged to remove gas generated at the first electrode and at least one second aperture arranged to remove gas generated at the second electrode and/or the photoelectrode;
   e. the photoelectrode being electrically connected to the first electrode, and a voltage source being arranged to provide a voltage difference between the first and second electrodes,
   wherein both the first electrode and the photoelectrode are in contact with a liquid electrolyte in the first chamber, and both the first electrode and the second electrode are in contact with a liquid electrolyte in the second chamber, and when the voltage source applies a voltage difference between the first electrode and the second electrode, one of oxygen and hydrogen is evolved at the first electrode, and the other of oxygen and hydrogen is evolved at the second electrode, and additionally at the photoelectrode when the photoelectrode is exposed to radiation.

2. The electrolyzer cell of claim 1 further comprising a first gas separator disposed within the first chamber between the photoelectrode and the first electrode, and a second gas separator disposed within the second chamber between the first electrode and the second electrode, the first and second gas separators preventing passage of gas bubbles therethrough but permitting passage of electric current therethrough.

3. The electrolyzer cell of claim 1 wherein said photoelectrode is provided with louvers or apertures.

4. The electrolyzer cell of claim 1 wherein said photoelectrode absorbs radiation into at least the near infra red, thereby having the ability to heat an electrolyte in the container.

5. The electrolyzer cell of claim 1 further comprising an optical irradiation concentrator in the form of a Fresnel lens or a cylindrical reflector arranged to direct radiation on to the photoelectrode.

6. The electrolyzer cell of claim 1 wherein the photoelectrode and second electrode each have their own conductive electrode base, which comprise one or more of titanium, nickel, carbon, or graphite.

7. The electrolyzer cell of claim 1 wherein one of the first and second electrodes comprises nickel hydroxide on nickel or on stainless steel, mixed metal oxides on titanium (MMO), plated nickel or nickel hydroxide film on-titanium, nickel or nickel hydroxide particles on titanium or on stainless steel.

8. The electrolyzer cell of claim 2 wherein the gas separators comprise a non-woven felt of polyolefin.

9. The electrolyzer cell of claim 2 wherein the surfaces of the gas separators are treated to prevent or reduce gas bubbles from sticking thereto.

10. The electrolyzer cell of claim 1 wherein the photoelectrode comprises at least one of (1) titania that is dyed to absorb light beyond that which is normally absorbed by titania, (2) titania that is doped with nitrogen, carbon, silicon, or other element, (3) strontium titanate, (4) compounds and alloys of titania and titanium with tungsten or tungsten oxide, cadmium sulfide, iron or oxides of iron, or silicon, (5) silicon seeded with protective nickel surface particles, (6) nanotubes of titanium dioxide further comprising dopants, dyes, or compounds as listed above, (7) carbon nanotubes further comprising semiconductor materials, (8) and graphene alone or combined with photoanode materials listed above, (9) photoanodes that incorporate either quantum dots or photonic bandgap crystals for enhanced light absorption, and (10) photoanodes in which nanostructures strain a semiconductor such as titanium dioxide (titania or $TiO_2$) such that the bandgap of the semiconductor is altered to favorably absorb more of the solar spectrum and also the band edges are more favorably aligned with the hydrogen and/or oxygen evolution potentials, and (11) any or all of the preceding photoanode materials in combination with a strained titania photoanode.

11. The electrolyzer cell of claim 1 wherein one of the first and second electrodes comprises a titanium metal base coated with mixed metal oxides or with nickel or nickel hydroxide film or particles.

12. The electrolyzer cell of claim 1 wherein one of the first and second electrodes comprises one or more of stainless steel in sheet or foam form, nickel in ribbon or foam form, graphite, or titanium.

13. The electrolyzer cell of claim 1 wherein the first and second chambers contain two electrolytes differing in chemical composition.

14. The electrolyzer cell of claim 1, wherein said photoelectrode functions as a diode.

15. An electrolyzer panel comprising a plurality of electrolyzer cells according to claim 1 connected physically to form a panel and connected electrically in either series or parallel.

16. A method of effecting electrolysis, the method comprising:
   providing an electrolyzer cell according to claim 1;

placing an electrolyte in the first and second chambers of the cell; and applying a voltage between the first and second electrodes while exposing the photoelectrode to radiation.

* * * * *